United States Patent
Tiberghien et al.

(10) Patent No.: US 10,190,713 B2
(45) Date of Patent: Jan. 29, 2019

(54) QUICK COUPLING ELEMENT WITH DISCHARGE MEMBER AND COUPLING MEMBER COMPRISING SUCH AN ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR); Frederic Morel, Lathuile (FR); Mathieu Sallaz, Talloires-Montmin (FR)

(73) Assignee: STAUBLI FAVERGES, Faverges (FR)

( * ) Notice: Subject to any disclaimer, the term of this patent is extended or adjusted under 35 U.S.C. 154(b) by 0 days.

(21) Appl. No.: 15/610,006

(22) Filed: May 31, 2017

(65) Prior Publication Data
US 2017/0350547 A1    Dec. 7, 2017

(30) Foreign Application Priority Data

Jun. 7, 2016   (FR) ...................................... 16 55186

(51) Int. Cl.
*F16L 37/34*   (2006.01)
*F16L 37/32*   (2006.01)

(52) U.S. Cl.
CPC .............. *F16L 37/32* (2013.01); *F16L 37/34* (2013.01)

(58) Field of Classification Search
CPC ............ F16L 37/32; F16L 37/40; F16L 37/34
USPC .................................................. 137/614.03
See application file for complete search history.

(56) References Cited

U.S. PATENT DOCUMENTS

| | | | | |
|---|---|---|---|---|
| 3,550,624 A | * | 12/1970 | Johnson | F16L 29/04 137/239 |
| 4,703,774 A | * | 11/1987 | Seehausen | E21B 33/0355 137/614 |
| 4,989,630 A | | 2/1991 | Yonezawa | |
| 2013/0319558 A1 | * | 12/2013 | Tiberghien et al. | F16K 17/00 137/798 |
| 2015/0267850 A1 | * | 9/2015 | Nowack et al. | F16L 37/32 251/149.6 |

FOREIGN PATENT DOCUMENTS

| | | |
|---|---|---|
| CN | 104 567 521 A | 4/2015 |
| DE | 41 14 480 A1 | 11/1991 |

OTHER PUBLICATIONS

French Search Report, dated Jan. 26, 2017.

* cited by examiner

*Primary Examiner* — Kevin Lee (57) ABSTRACT

A quick coupling element with discharge member and coupling member comprising such an element are disclosed. The coupling element comprises a tubular body defining an inner channel for the passage of a pressurized fluid and a longitudinal axis, and a relief member of the inner channel, movable between a first position, closing off a relief passage connecting the inner channel to the outside of the body, and a second forward position where it does not close off this relief passage. The relief member is a ring that is that is movable between two positions around a central member. The relief ring defines, at least in part, the relief passage. In the first position, the relief ring seals the central member over a first sealing circumference, and against the peripheral part over a second sealing circumference. The coupling element further comprises an elastic return member for returning the relief ring toward its first position.

16 Claims, 8 Drawing Sheets

QUICK COUPLING ELEMENT WITH DISCHARGE MEMBER AND COUPLING MEMBER COMPRISING SUCH AN ELEMENT

FIELD OF THE INVENTION

The invention relates to a quick coupling element used for the detachable connection of pressurized fluid pipes and which comprises, inter alia, a discharge member for its inner channel. The invention also relates to a quick coupling member incorporating such a coupling element.

BACKGROUND OF THE INVENTION

In the field of couplings for pressurized fluid pipes, a safety problem may appear when the residual pressure in a fluid pipe connected to a coupling element reaches a high value, for example when the temperature of a fluid contained in this pipe increases, which causes an increase in the pressure of this pipe. In case of high pressure in the inner volume of a coupling element, it may be difficult to couple the two elements of a coupling member to connect two conduits. In some cases, such an overpressure may damage certain components of a circuit connected to a conduit experiencing an overpressure.

To resolve this problem, it is known, for example from U.S. Pat. No. 4,703,774 or CN-A-104,567,521, to install, within a closing valve of a coupling element, a bead subject on the one hand to the pressure prevailing within this coupling element, and on the other hand to the action of a return spring and the ambient pressure. This bead forms a relief valve for the coupling element in case of overpressure. It makes it possible to limit the pressure of the fluid within the coupling element. This solution is suitable for an underwater coupling, like that considered in U.S. Pat. No. 4,703,774, which may have relatively large dimensions. Conversely, it is difficult to implement with a coupling having smaller dimensions, since the available space at the center of the coupling element may be insufficient to house a bead with an appropriate size. Furthermore, the operating range of the relief valve formed by the bead is relatively limited. A high pressure is necessary within the coupling element to separate the bead from its seat, i.e., the trigger the discharge of the fluid, against the action exerted by the return spring.

Furthermore, the coupling elements known from DE-A-41 14 480 or U.S. Pat. No. 4,989,630, which have no relief member, do not make it possible to react to a pressure increase in the inner channel of these coupling elements.

SUMMARY OF THE INVENTION

The invention more particularly aims to resolve these drawbacks by proposing a new quick coupling element in which the relief connection can be made reliably, including for coupling members with a relatively small diameter, and while broadening the operating range of the relief member(s).

To that end, the invention relates to a quick coupling member for the removable connection of pressurized fluid pipes, this element comprising a tubular body, defining an inner channel for the passage of pressurized fluid and a longitudinal axis of the coupling element, as well as means for closing off the inner channel on the side of a front face of the coupling element. This coupling element also comprises a relief member of the inner channel, said relief member being movable between a first position, in which it closes off a relief passage connecting the inner channel to the outside of the body, and a second forward position relative to the first position, in which it does not close off this relief passage. According to the invention, the relief member is a relief ring that is part of the means for closing off the inner channel and that is mounted around a central member, which is also part of the closing off means, and inside a peripheral part. Furthermore, a first surface of the relief ring is part of the front face. The relief ring is movable, relative to the central member and parallel to the longitudinal axis, between its first and second positions. The relief ring defines, at least in part, the relief passage with the central member or with the peripheral part. Its first position, the relief ring bears sealably against the central member, over a first sealing circumference, and bears sealably against the peripheral part, over a second sealing circumference. A diameter of the second sealing circumference is strictly larger than a diameter of the first sealing circumference. Furthermore, the coupling element comprises an elastic return member for returning the sealing ring toward its first position. This elastic member pushes the relief ring back toward the inside of the tubular body and/or toward the rear of the coupling element.

Owing to the invention, the relief ring, which by construction has an annular shape, has, on the side of the inner channel of the coupling element, a second surface that is radially defined between the first sealing circumference and the second sealing circumference, with a sealing section area sufficient for the pressure of the fluid present in this inner channel to act effectively against the elastic return member to cause the relief ring to go from its first axial position toward its second axial position, when necessary in light of the value of this pressure. The area of this second surface may be larger than the area of a bead portion exposed to the inner pressure of the coupling element, without having to increase the diameter of this coupling element. The invention is therefore suitable for coupling members having a relatively small diameter, in particular a coupling member with an inner passage diameter smaller than or equal to 25 mm. Furthermore, in light of the geometry of the relief ring, the latter can be moved from its first position toward its second position under the effect of a relatively low inner pressure of the coupling element. The invention therefore makes it possible to optimize the operating ranges of the relief member, which is separate from a valve that also belongs to the members for closing off the inner channel and performs a different function from this channel. Indeed, the valve makes it possible to isolate the inner channel from the outside or to place the inner channel in communication with an inner channel of another coupling element, while the relief ring makes it possible to discharge fluid toward the outside when an overpressure appears in the inner channel, as long as the valve closes off this channel.

Within the meaning of the invention, a diameter of a sealing circumference is a diameter equal to the diameter of this circumference if said circumference has a zero radial thickness. If the sealing circumference has a non-zero radial thickness, a diameter of the circumference is a diameter whose value is comprised between the minimum diameter and the maximum diameter of this sealing circumference.

According to advantageous, but optional aspects of the invention, such a coupling element may incorporate one or more of the following features, considered in any technically allowable combination:

The means for closing off the inner channel on the side of the front face comprise a valve moving, along the longitudinal axis, between a first closing position, where it closes off the inner channel, and a second withdrawn position relative to its first position, where it defines an annular passage placing the inner channel in communication with an inner channel of a complementary coupling element, while the relief ring is separate from the valve and movable, along the longitudinal axis, from its first position toward its second position, under the effect of the fluid pressure within the inner channel.

In its first position, the relief ring bears, along a direction parallel to the longitudinal axis, against a sealing seat formed by the central member and closes off the relief passage that it defines with the central member.

The closing off means further comprise a valve that is positioned, radially to the longitudinal axis, between the central member and the body, this valve forming the peripheral part and surrounding the relief ring at the front face.

The closing off means further comprise a valve that is positioned, radially to the longitudinal axis, between the central member and the body and that is positioned, at the front face, radially to the inside of the relief ring.

In the second position of the relief ring, the relief passage extends between the valve and the relief ring.

The tubular body forms the peripheral part and defines, with the relief ring, the relief passage that the relief ring closes off when it is in its first position and in sealed bearing with the tubular body.

The central member is secured to the body and comprises a surface that constitutes part of the front face.

The central member and the relief ring belong to an assembly movable, parallel to the longitudinal axis and relative to the body, between a forward position, where the moving assembly is in sealed contact with body and closes off the inner channel, and a withdrawn position, where a fluid passage is arranged between the moving assembly and the body.

In its first position, the relief ring bears, on the first sealing circumference, against a surface of the central member that is frustoconical and convergent toward the front face.

The frustoconical surface has an apical angle comprised between 60 and 120°.

In the uncoupled configuration of the coupling element, the relief passage emerges on the front face.

In the uncoupled configuration of the coupling element and when the relief ring is in its first position, respective front faces of the closing off means are aligned in a plane perpendicular to the longitudinal axis.

According to a second aspect, the invention also relates to a quick coupling member for removably joining pressurized fluid pipes, this coupling member comprising a female coupling element and a complementary male coupling element. According to the invention, at least one of these coupling elements is as described above.

Advantageously, in the coupled configuration of the coupling member, at least one mechanical member for closing off the inner channel of the coupling element is in a withdrawn position, where it defines, with the body of this coupling element, an annular passage for the pressurized fluid. According to the considered embodiments, the mechanical member for closing off the inner channel that performs this function may be the valve, the relief ring, the assembly formed by the valve and the relief ring, or any other closing off means. This mechanical closing off member opens, in the coupled configuration of the coupling member, a flow passage for the fluid present in the inner channel of a first coupling element, toward the inner channel of the second complementary element of the coupling member. This passage is formed between the mechanical closing off member and the body, or between this mechanical closing off member and the central member.

BRIEF DESCRIPTION OF THE DRAWINGS

The invention will be better understood and other advantages thereof will appear more clearly in light of the following description of five embodiments of a coupling element according to its principle, provided solely as an example and done in reference to the appended drawings, in which.

DETAILED DESCRIPTION OF THE INVENTION

The coupling member R shown in FIGS. 1 to 7 comprises a female coupling element 100 and a male coupling element 200, intended to fit in one another.

Figure 1:
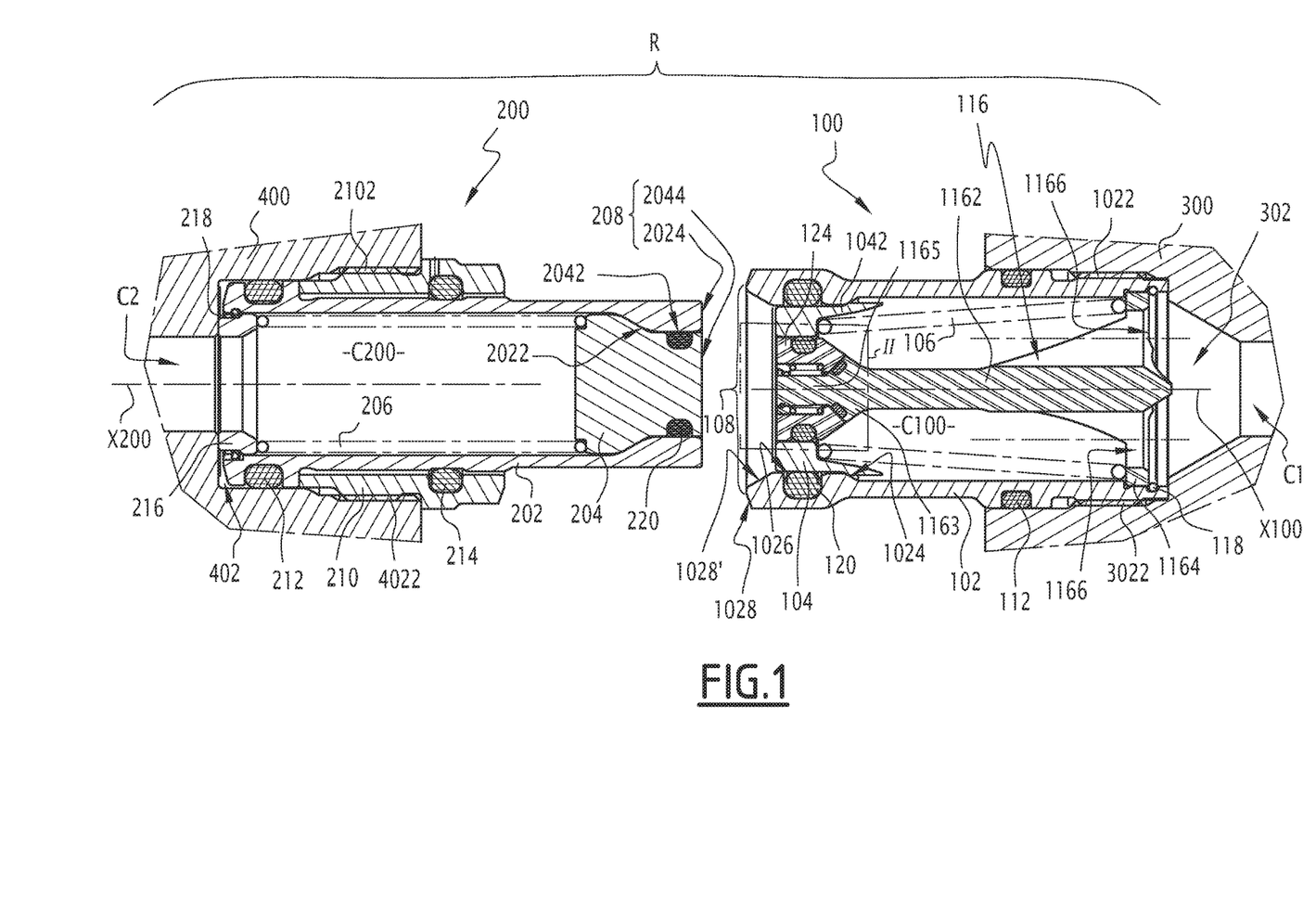
FIG. 1 is an axial sectional view of a coupling member according to the invention comprising a female coupling element also according to the invention.

The male element 200 comprises a body 202 that defines a longitudinal axis X200 of the male element 200 and inside which a valve 204 is mounted, elastically loaded by a spring 206 toward a seat 2022 formed by an inner radial surface of the body 202, which is frustoconical and convergent toward the front face 208 of the coupling element 200.

In this description, the forward direction of a coupling element is described as the direction oriented in the direction of fitting or coupling, i.e., toward the complementary coupling element when the latter are aligned and ready to be fitted together as shown in FIG. 1. Conversely, the rear direction of a coupling element is defined as the direction opposite the complementary coupling element. This rear direction is turned toward a pipe, at the end of which the coupling element is mounted. The proximal part of a coupling element is its part situated at the rear, while the distal part of a coupling element is its part situated toward the front.

The body 202 of the male element 200 defines an inner channel C200 for the circulation of pressurized fluid, which is fluidly connected to a channel C2 at the end of which the element 200 is mounted. In the example, the channel C2 is made in a frame 400 that comprises a housing 402 in which the pipe C2 emerges and in which a rear part of the male element 200 is received that is immobilized in this housing by a ring 210 whereof an outer thread 2102 engages with a tapping 4022 of the housing 402. Two sealing gaskets 212 and 214 are respectively provided between the rear part of the body 202 and the peripheral surface of the housing 402, on the one hand, and between the outer peripheral surface of the body 202 and the ring 210 on the other hand. A ring 216 is immobilized in the rear part of the body 202 using a circlips 218. This ring 216 serves as a stop for the spring 206, which can effectively press the valve 204 against the seat 2022. The valve 204 is equipped with an outer peripheral groove 2042 in which a sealing gasket 220 is inserted that provides the isolation between the channel C200 and the outside of the male element 200, toward the front of the male coupling element 200 past the seat 2022 relative to this channel.

The front face 208 is formed by two portions respectively made up of the front face 2044 of the valve 204, which is disc-shaped and centered on the axis X200, and the front face 2024 of the body 202, which has an annular shape, also centered on the axis X200 and which surrounds the front face 2044.

The female element 100 of the coupling member R in turn comprises a body 102 that is screwed in a housing 302 of a frame 300. The body 302 defines an inner channel C100 of the female element 100 in which the pressurized fluid can circulate, as well as a longitudinal axis X100 of this female element. The body 102 is provided with an outer thread 1022 that cooperates with a tapping 3022 of the housing 302. A sealing gasket 112 is inserted between the outer peripheral surface of the body 102 and the peripheral surface of the housing 302.

The frame 300 defines a pipe C1 that emerges in the housing 302 and that is in permanent communication with the inner channel C100.

The female coupling element 100 comprises a valve 104 that is elastically loaded by a spring 106 toward a seat 1024 formed by an inner frustoconical surface of the body 102, this surface converging toward the front of the female coupling element 100. The valve 104 is provided with a rear skirt 1042 configured to bear against the seat 1024 when the female coupling element 100 is in the closed configuration, i.e., when the valve 104 is in a first position where it isolates the inner channel C100 from the outside of the female coupling element 100. A sealing gasket 120 is positioned in an inner peripheral groove 1026 of the body 102, which is axially aligned, along the axis X100, with the valve 104 in the closed configuration of the female coupling element 100. Thus, the sealing gasket 120 contributes to isolating the volume C100 from the outside. A push-piece 116 is immobilized in the body 100 and comprises a rod 1162 as well as a base 1164 positioned behind the rod 1162 and is pierced with four orifices 1166 that place the housing 302 and the inner channel C100 in permanent fluid communication. The push-piece 116 is immobilized in the body 102 using a circlips 118. The spring 106 bears on the base 1164 of the push-piece 116. The push-piece 116 also comprises a collar 1163 arranged on the front of the rod 1162 as well as a nose 1165 that extends the rod 1162 past the collar 1163 and that is provided with an outer peripheral groove 1167 and three longitudinal slots 1169 regularly distributed around the axis X100. Reference 1168 denotes the end face of the push-piece 116 opposite the base 1164 that is disc-shaped and constitutes the front face of the push-piece 116.

A relief ring 124, separate from the valve 104, is mounted around the nose 1165 of the push-piece 116 and defines an outer peripheral groove 1242 in which a sealing gasket 126 is housed that bears against an inner radial surface 1046 of the valve 104 when the latter is in the closing configuration of the inner channel C100. For the clarity of the drawing, the sealing gasket 126 has not been shown in FIG. 3.

Figures 2, 3:
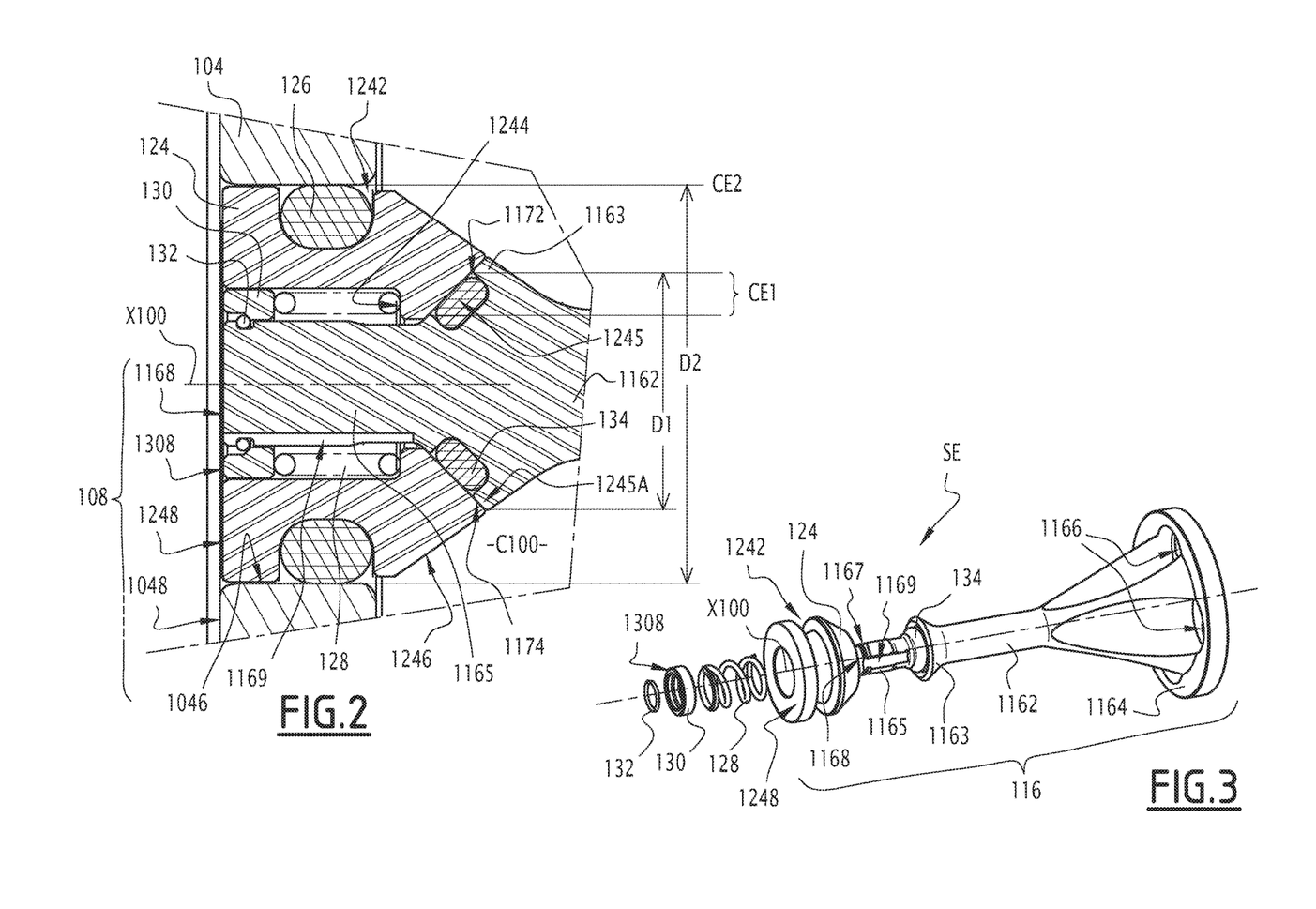
FIG. 2 is an enlarged view of detail II in FIG. 1.
FIG. 3 is an exploded perspective view of an inner subassembly of the female element of the coupling member of FIG. 1.

A spring 128 is mounted around the nose 1165, inside the relief ring 124, and bears, on the rear, against an inner shoulder 1244 of the relief ring 124, and, on the front, against a stop ring 130, which in turn is retained on the push-piece 116 owing to a circlips 132 engaged in the groove 1167.

A sealing gasket 134 is positioned in a groove 1172 arranged in a frustoconical surface 1074 that defines the collar 1163 in the forward direction, i.e., on the side of the face 1168 of the push-piece 116. The surface 1174 converges forward, toward the axis X100, and its apical angle is denoted Q. The value of this angle Q is comprised between 60° and 120°, preferably about 90°.

The various sealing gaskets of the female 100 and male 200 elements are preferably made from a synthetic or natural elastomer. In practice, the sealing gasket are O-rings with a circular section when they are not stressed, which is for example visible for the seal 134 in FIG. 4. The other parts of these coupling elements are preferably made from metal or a composite material.

Reference 1308 denotes the annular surface of the stop ring 130 opposite the spring 128. Reference 1248 denotes the annular surface of the sealing ring 124 mounted on the front of this ring and which is positioned opposite the collar 1163 in the mounted configuration of the female coupling element 100. Reference 1048 denotes the annular surface of the valve 104 opposite the spring 106. Reference 1028 denotes a frustoconical surface of the body 102 that defines this body toward the front, opposite the thread 1022. The surface 1028 converges forward. Lastly, reference 1028' denotes a forward frustoconical surface of the body 102 that diverges forward and that is situated, axially along the axis X100, between the front of the body 102 and the groove 1026.

The surfaces 1168, 1308, 1248, 1048, 1028' and 1028 are concentric and together constitute the front face 108 of the female coupling element 100. More specifically, the surface 1028 radially surrounds the surface 1028', which radially surrounds the surface 1048, which radially surrounds the surface 1248, which radially surrounds the surface 1308, which radially surrounds the surface 1168, which is centered on the axis X100. In practice, all of the surfaces 1168, 1308, 1248, 1048 and 1028' are centered on the axis X100.

The bodies 102 and 202 are each globally cylindrical and hollow, with a circular section. Likewise, the valves 104 and 204, the push-piece 107 and the rings 124 and 130 have a circular section, the circular section of the base 1164 and that of the nose 1165 being modified to create the orifices 1166 and the slots 1169.

In the uncoupled configuration of the coupling member shown in FIGS. 1 and 2, a frustoconical rear surface 1245 of the relief ring 124 bears both against the seal 134 and opposite and/or bearing against the surface 1174 of the push-piece 116. The surface 1174, which is stationary relative to the body 102 and the push-piece 116 to which it belongs, forms a seat for receiving the frustoconical surface 1245, this seat being equipped with the seal 134. The frustoconical surface 1245 converges toward the front of the relief ring 124, i.e., toward its front face 1248, and has an apical angle equal, to within any machining allowances, to the angle α. In this configuration, the relief ring 124 is sealably bearing against the push-piece 116 over a sealing circumference CE1 having an annular shape and the maximum diameter of which is denoted D1. This maximum diameter is in practice very close, or equal, to the maximum diameter of the seal 134 when it is compressed between the parts 116 and 124. The minimum diameter of the sealing circumference CE1 is very close, or equal, to the minimum diameter of the seal 134 in this configuration. Thus, the circumference CE1 has an annular and frustoconical shape, with a non-zero radial thickness.

Furthermore, and still in this configuration, the sealing ring 124 is in sealed contact, via the seal 126 that it bears and over a second sealing circumference CE2, with the inner radial surface 1046 of the valve 104. Since the inner radial surface 1046 of the valve 104 is radial with respect to the axis X100, the radial thickness of the circumference CE2 [is] zero or, in practice, practically zero. Reference D2 denotes the sealing circumference CE2, which in practice is equal to the diameter of the inner radial surface 1046 of the valve 104. Sealed contact between two parts of the coupling member, or sealed bearing between these two parts, can be defined relative to two facing surfaces of the parts. Play exists that is overcome by one or several intermediate sealing means they participate in the sealing function between the two parts. In other words, a part is in sealed contact against or with another part if their direct contact suffices to perform a sealing function, or if sealing means exist that fill in the play between these two parts, in particular at a sealing circumference.

The diameter D2 is strictly larger than the diameter D1, which corresponds to the fact that the circumference CE2 is further from the axis X100 than the circumference CE1 and these circumferences are separate.

A rear surface 1246 of the relief ring 124, the area of which is non-zero, is exposed to the pressure prevailing in the channel C100. The pressure C100 is also exerted on the portion 1245A of the surface 1245 that extends radially past the seal 134 in the configuration of FIGS. 1 and 2. In all, the pressure in the channel C100 is exerted on the relief ring 124, over a surface equivalent to the difference in the areas of the sections defined by the outer diameters of the seals 126 and 134.

The surface 1246 is frustoconical and converges toward the rear, i.e., opposite the surface 1248.

The operation of the coupling element 200 is as follows:

In the configuration shown in FIGS. 1 and 2, the front faces 1168, 1308, 1248 and 1048 are aligned in a plane perpendicular to the axis X100.

In the uncoupled configuration, the members 104, 116 and 124 close off the front opening of the body 102, which is bordered by the seal 120. In particular, the spring 128 pushes the relief ring 124 back in contact with the seal 134 and the surface 1174. In light of the presence of the seals 120, 126 and 134, the inner channel C100 is isolated from the outside of the coupling element 100.

The case is considered where the pipe C1 is connected to an electronic facility that must be cooled with a heat transfer fluid. In the uncoupled configuration of the elements 100 and 200 of the coupling member R, the temperature of this heat transfer fluid can increase under the effect of the dissipation of heat coming from electronic components of the aforementioned facility. In this case, the pressure of the heat transfer fluid within the inner channel C100 increases. This pressure is in particular exerted on the rear surface 1246 of the relief ring 124, and on the portion 1245A of the surface 1245, the sum of these surfaces having a non-zero area.

Figure 4:
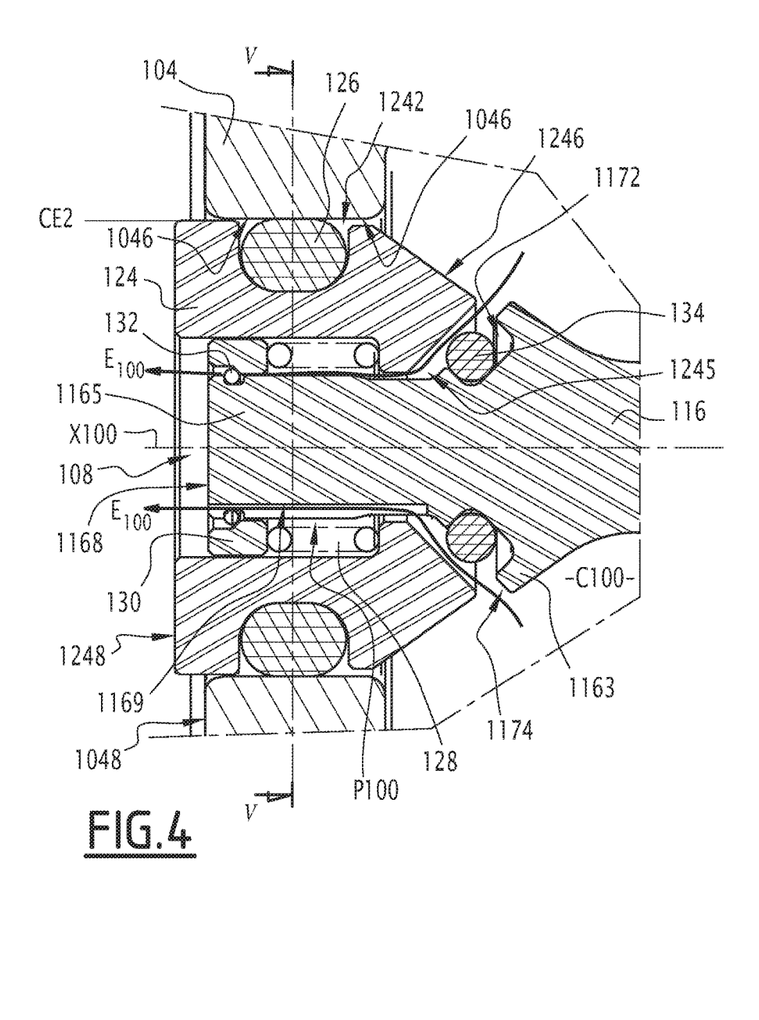
FIG. 4 is a view similar to FIG. 2 when a relief ring is in a configuration different from that of FIG. 2.
Figure 5:
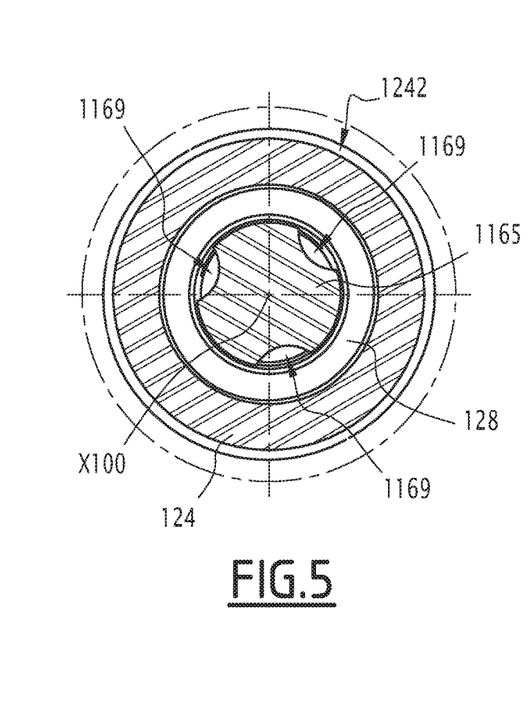
FIG. 5 is a partial sectional view along line V-V in FIG. 4.

When the pressure exerted on the surfaces 1246 and 1245A is sufficient to overcome the elastic return force exerted by the spring 128, the relief ring 124 is moved from its first position shown in FIG. 2 to its second position shown in FIG. 4, in which the surface 1245 is separated from the surface 1174 and the seal 134. The fluid present in the inner channel C100 can then flow between the opposite surfaces 1245 and 1174, then inside the relief ring 124 until it emerges at the front face 108 of the female coupling element 100, around the surface 1168. In FIG. 4, the arrows $E_{100}$ show a theoretical flow of the fluid in a relief passage P100 that is defined between the parts 116 and 124. This flow $E_{100}$ through the passage P100 is made normally possible when the relief ring 124 is in its second position. As shown in the bottom part of FIG. 4, this relief passage P100 includes the slots 1169, downstream from the frustoconical surface 1245. It will, however, be noted, in the top part of FIG. 4, that the fluid can also flow in the relief passage P100 around the nose 1165 outside the slots 1169, since the assembly of the stop ring 130 around the nose 165 is not sealed.

During the movement of the relief ring 124 around the push-piece 116 and along the axis X100, between its first axial position shown in FIG. 2 and its second axial position shown in FIG. 4, the sealing gasket 126 remains in contact with the inner radial surface 1046 of the valve 104 at the circumference CE2, such that the sealing between this valve 104 and the relief ring 124 remains guaranteed.

When the pressure within the channel C100 has decreased due to the evacuation of part of the fluid through the relief channel P100 identified above, the spring 128 is capable of pushing the ring 124 back toward the rear, i.e., causing it to go from its second axial position shown in FIG. 4 to its first axial position shown in FIG. 2. The relief channel P100 is then closed and the inner conduit C100 is again isolated from the outside of the female coupling element 100.

The parts 116 and 124 to 134 form a telescoping subassembly SE of the female coupling element 100 that is visible in FIG. 3, with the exception of the illustration of the seal 126, and that makes it possible to control the discharge toward the outside of part of the fluid contained in the channel C100, based on the pressure of the fluid in this channel.

Figure 6:
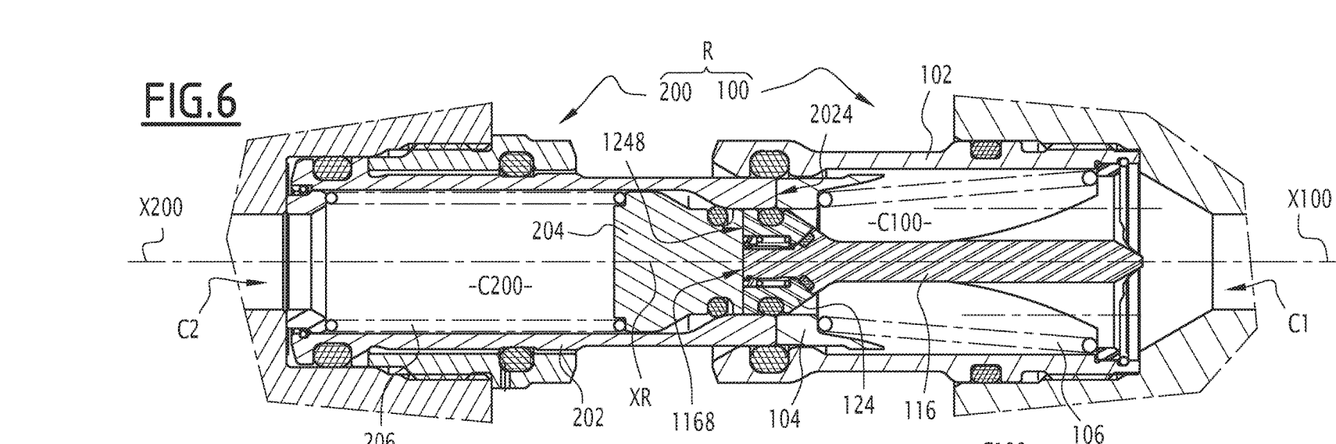
FIG. 6 is a sectional view comparable to FIG. 1, but on a smaller scale, during coupling of the male and female elements of the coupling member.

When the elements 100 and 200 need to be coupled, and as shown in FIG. 6, the axes X100 and X200 are aligned to form a shared axis XR that is the fitting axis of the coupling member, the front faces 108 and 208 then being across from one another. The coupling elements 100 and 200 are then brought closer to one another along the axis XR, which results in causing the part 2024 of the front face 208 to bear against the valve 104 and the front faces 1168 and 1248 of the push-piece 116 and the relief ring 124 to bear against the valve 204. This results in pushing back the valves 104 and 204, inside the bodies 102 and 202, respectively, against the forces exerted by the springs 106 and 206. One then reaches the beginning of fitting configuration shown in FIG. 6, where the inner channels C100 and C200 are still isolated from one another.

Figure 7:
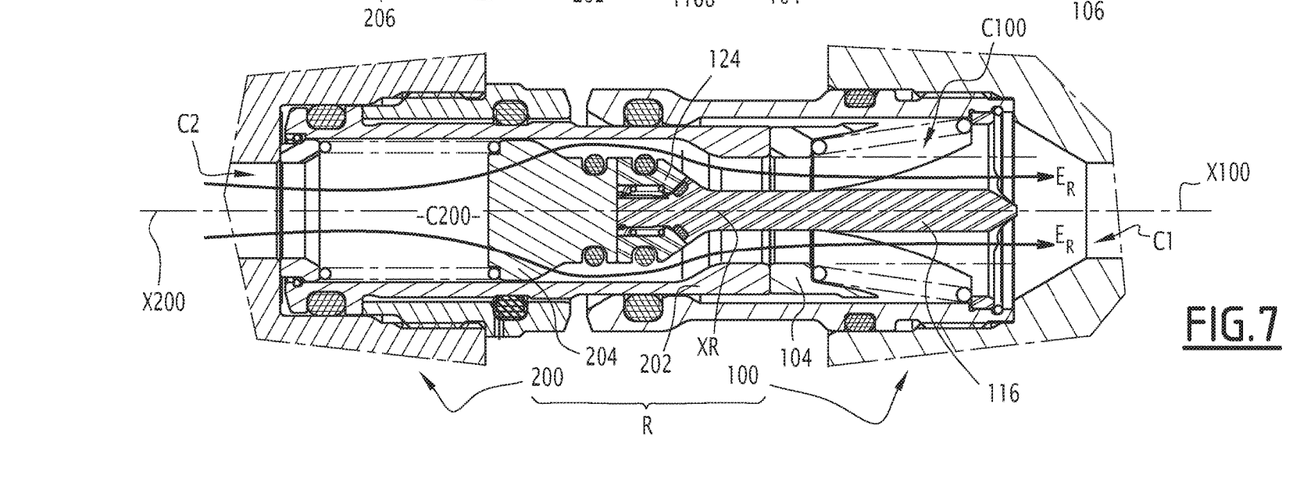
FIG. 7 is a sectional view similar to FIG. 6, when the elements of the coupling member are coupled.

By continuing the fitting movement, one reaches the configuration of FIG. 7, where the valves 104 and 204 are in a second withdrawn positions where they define, with the bodies 102 and 202, respectively, annular passages, to the point that the inner channels C100 and C200 are in communication, which is shown by the flow arrows $E_R$, in the case where a heat transfer fluid is delivered by the male coupling member 100 to recharge the pipe C1 from the pipe C2. In this configuration, the relief ring 124 and the push-piece 116 remain bearing against the valve 204, while the body 202 remains bearing against the valve 104.

In practice, the valve 204 is provided, in a plane different from that of FIG. 7, with channels for the passage of the fluid allowing the flow in the direction of the arrows $E_R$.

Alternatively, the flow occurs from the pipe C1 toward the pipe C2, i.e., in the direction opposite that of the arrows $E_R$. According to an aspect of the invention that is not shown, a system for locking the elements 100 and 200 of the coupling member in the coupled configuration can be provided, in particular in the form of a system with beads, bayonets or prongs. A locking system with beads is shown for the third embodiment of FIGS. 10 and 11.

FIGS. 1, 6 and 7 show that during the coupling of the elements 100 and 200, i.e., during the passage from the configuration of FIG. 1 to the configuration of FIG. 7, the relief ring 124 and the push-piece 116 of the telescoping subassembly SE do not move relative to one another along the axis X100. The relief ring 124 remains its first position, where it closes off the relief passage P100. The same will be true during the uncoupling of the elements 100 and 200, which is done by gradually moving the elements apart, i.e., going from the configuration of FIG. 7 to that of FIG. 6, then to that of FIG. 1. Thus, the coupling and uncoupling of the coupling elements takes place without opening the passage P100, which prevents the volumes contained between the push-piece 116 and the valve 124 from filling.

The position shown in FIG. 4 is not the maximum separation position between the surfaces 1245 and 1174. This maximum separation position results from several factors, such as the length of the nose 1165, the characteristics of the spring 128, the dimensions of the ring 124, the difference in the areas of the sections formed by the diameters of the seals 126 and 134, and the dimensions of the stop ring 130. In practice, this maximum separation position is only rarely reached, since the separation of several millimeters or several tenths of millimeters between the surfaces 1245 and 1174 suffices to discharge several drops of fluid present in the inner channel C100 to decrease the pressure in this channel, to the point that the relief ring 124 returns toward its first position under the action of the spring 128.

Taring the inner pressure of the female coupling element 100 for which the relief ring 124 goes from its first position to its second position can be done by acting on the characteristics of the spring 128, the geometry of the relief ring 124, in particular the ratio of the diameters D1 and D2. In this respect, the difference between the diameters D1 and D2, i.e., the difference between the diameters of the seals 126 and 134, makes it possible to create the surfaces 1246 and 1245A of the ring 124 whereof the projection in a plane perpendicular to the axis X100 has a sufficient area for the pressure to effectively drive the relief ring 124 forward, going from the first position of FIG. 2 to the second position of FIG. 4, while the area of this surface is substantially larger than the area of the bead installed on the axis of a coupling element, as set out in the state of the art.

The relief sealing seat, formed by the surface 1245, is different from the opening sealing seat of the inner channel 100 in the coupling phase, formed by the surface 1024. The inner passage diameter of the coupling member R can be relatively small, in particular less than 25 mm, without constituting a drawback to produce an effective relief system near the front surface 108 of the coupling element 100.

The use of the relief ring 124, which, according to this embodiment, has annular surfaces 1246 and 1245A exposed to the pressure in the channel C100, makes it possible to improve its sensitivity to pressure and its reactivity in case of overpressure. In other words, the relief ring 124 of the coupling element 100 is sensitive to a lower pressure than a bead of the state of the art.

Like in the first position of the relief ring 124, the sealing zone between the push-piece 116 and the relief ring 124 is made in a frustoconical plane, at the interface between the surfaces 1245 and 1174 and the seal 134, and the axial travel, parallel to the axis X100, of the ring 124 necessary for the relief is low, which limits the friction to which the seals are subjected, in particular the seal 126.

Furthermore, the movement of the relief ring 124 under the effect of a pressure increase in the inner channel C100 is directly visible from the outside, since the surface 1248 is part of the front face 108 of the female coupling element 100. Indeed, in the second position of the relief ring 124, this surface 1248 is axially offset, along the axis X100, relative to the surfaces 1168 and 1048, as shown in FIG. 4.

Since, during the coupling and uncoupling phases of the male and female elements of the coupling member R, the elements 116 and 124 do not move relative to one another along the axis X100, the relief passage P100 remains closed during these phases, which guarantees that the coupling element 100 only leaks when it is in the uncoupled configuration, under the effect of an overpressure in the inner channel C100.

Figure 8:
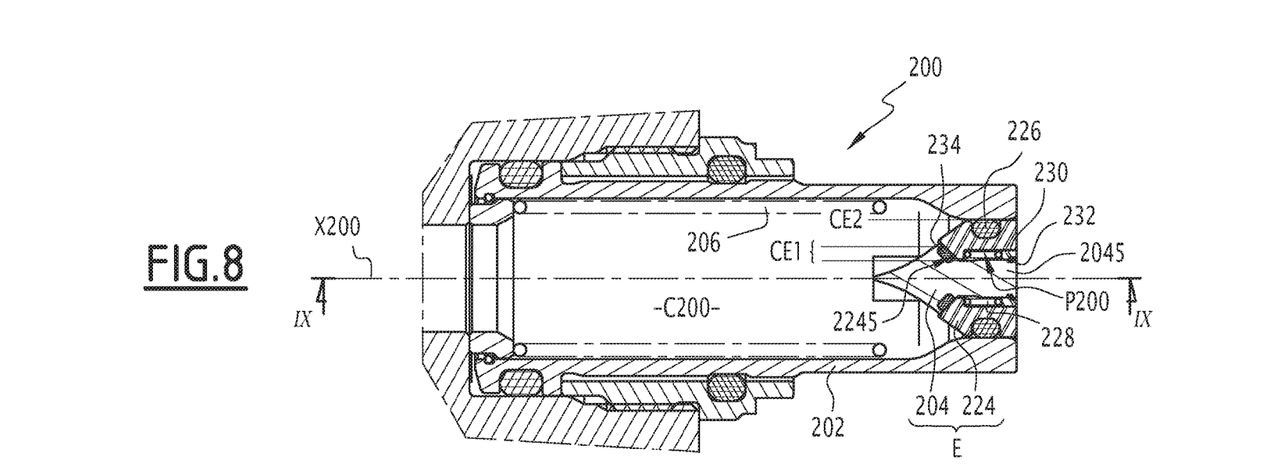
FIG. 8 is an axial sectional view of a male coupling element according to a second embodiment of the invention.

In the second to sixth embodiments of the invention shown in FIG. 8 and following, the elements similar to those of the first embodiment bear the same references and are not described in detail. Hereinafter, we primarily mention the differences between these embodiments and the first embodiment.

Figure 9:
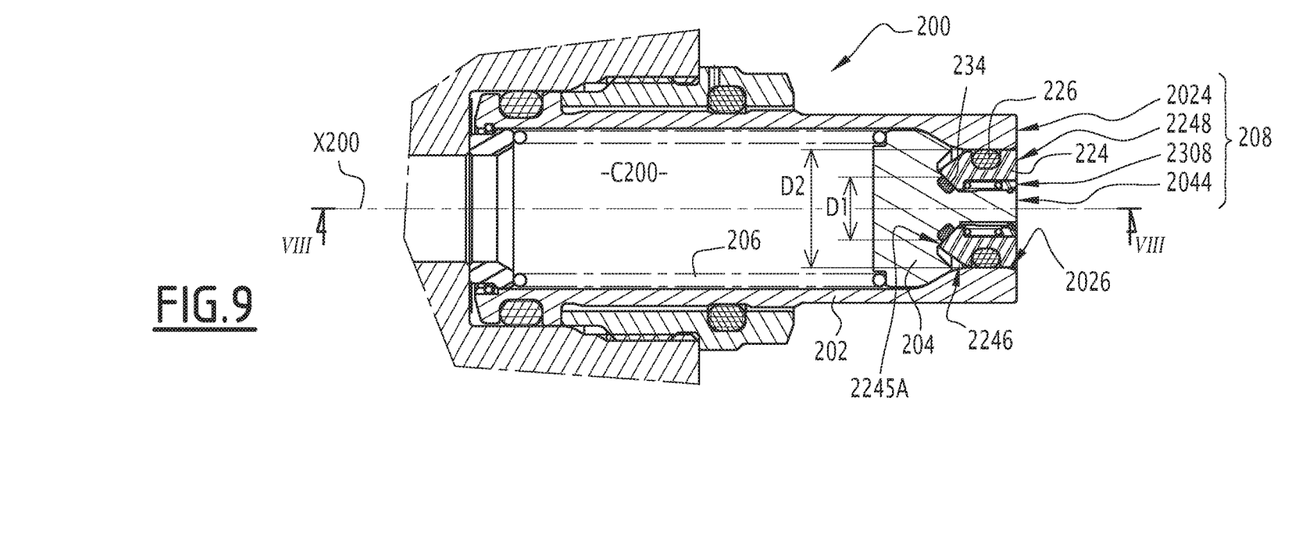
FIG. 9 is an axial sectional view along lines IX-IX in FIG. 8, VIII-VIII indicating the cutting plane of FIG. 8.

In the second embodiment shown in FIGS. 8 and 9, the male coupling element 200 is equipped with a relief ring 224 that is mounted not on a stationary push-piece relative to the body 202, but around the valve 204, which is movable relative to this body, along the axis X200, between a first position and a second position similar to those defined for the valve 104 of the first embodiment. The parts 204 and 224, which are separate from one another, belong to an assembly E that is movable along the axis X200 inside the body 202 and that is subject to the action of the spring 206 and the action of the push-piece of a female element that can be a traditional female element, with no relief ring, [or] the female element 100 of the first embodiment. During the movements of the assembly E, the parts 204 and 224 keep their relative positions along the axis X200. In the uncoupled configuration of the coupling member, the assembly E bears against a seat formed by the body 202 and closes off the inner channel C200 in the forward direction. In the coupled configuration, a fluid passage is arranged between this assembly E and the body 202, with an arrangement similar to that shown in FIG. 7 for the valve 204 inside the body 202. The parts 204 and 224 then define an annular passage placing the inner channel in communication with an inner channel of a complementary coupling element. The assembly E here plays the role of the valve 204 of the first embodiment. It is movable between a forward position and a withdrawn position that respectively correspond to the uncoupled and coupled configurations of the coupling member.

The relief passage here is radially defined between the valve 204 and the relief ring 224 when the relief ring is in its second position.

Like in the first embodiment, the relief ring 224 bears a sealing gasket 226 that bears against the peripheral part, which here is formed by the body 202, whereas, in the first embodiment, this peripheral part is formed by the valve 104. More specifically, the seal 226 radially bears against an inner radial surface 2026 of the body 202.

Like in the first embodiment, a spring 228 pushes the relief ring 224 back by default to bear against a seal 234 borne by the valve 204, and toward the rear of the coupling element 200. The spring 228 bears on a stop ring 230 immobilized on a front nose 2045 of the push-piece 204 owing to a circlips 232. The relief ring 224 is mounted sliding on this front nose 2045.

Like in the first embodiment, references 2024 and 2044 denote the respective front faces of the body 202 and the valve 204. References 2248 and 2308 also denote the respective front faces of the rings 224 and 230. The front face 2024 surrounds the front face 2248, which surrounds the front face 2308, which surrounds the front face 2044. The front faces 2024, 2248 and 2308 are annular and planar. The front face 2248 is disc-shaped. In the uncoupled configuration of the male coupling element 200 and when the relief ring closes off the relief passage P200, the front faces 2024, 2248, 2308 and 2044, which together make up the front face 208 of the element 200, are aligned in a plane perpendicular to the axis X200, as shown in FIGS. 8 and 9.

Like in the first embodiment, the bearing of the relief ring 224 on the valve 204 takes place, in the closed position, on two separate sealing circumferences CE1 and CE2, which makes it possible to define a frustoconical annular surface 2246 on which part of a pressure force can be exerted due to the pressure of the fluid within the inner channel C200 defined by the body 202. This pressure is also exerted partly on a portion 2245A of a surface 2245 defined as in the first embodiment. The first sealing circumference CE1 is defined around the seal 234, and its maximum diameter is denoted D1. The second sealing circumference CE2 is defined at the interface between the seal 226 and the surface 2026. Its diameter is denoted D2. The diameter D2 is strictly larger than the diameter D1.

The third to sixth embodiments relate to the case where the invention is implemented within a female coupling element, comparable to the element 100 of the first embodiment. It could also be implemented within a male coupling element comparable to the element 200 of the second embodiment.

In these embodiments, the valve 104 and the relief ring 124 assume first and second positions, like in the first embodiment.

Figure 10:
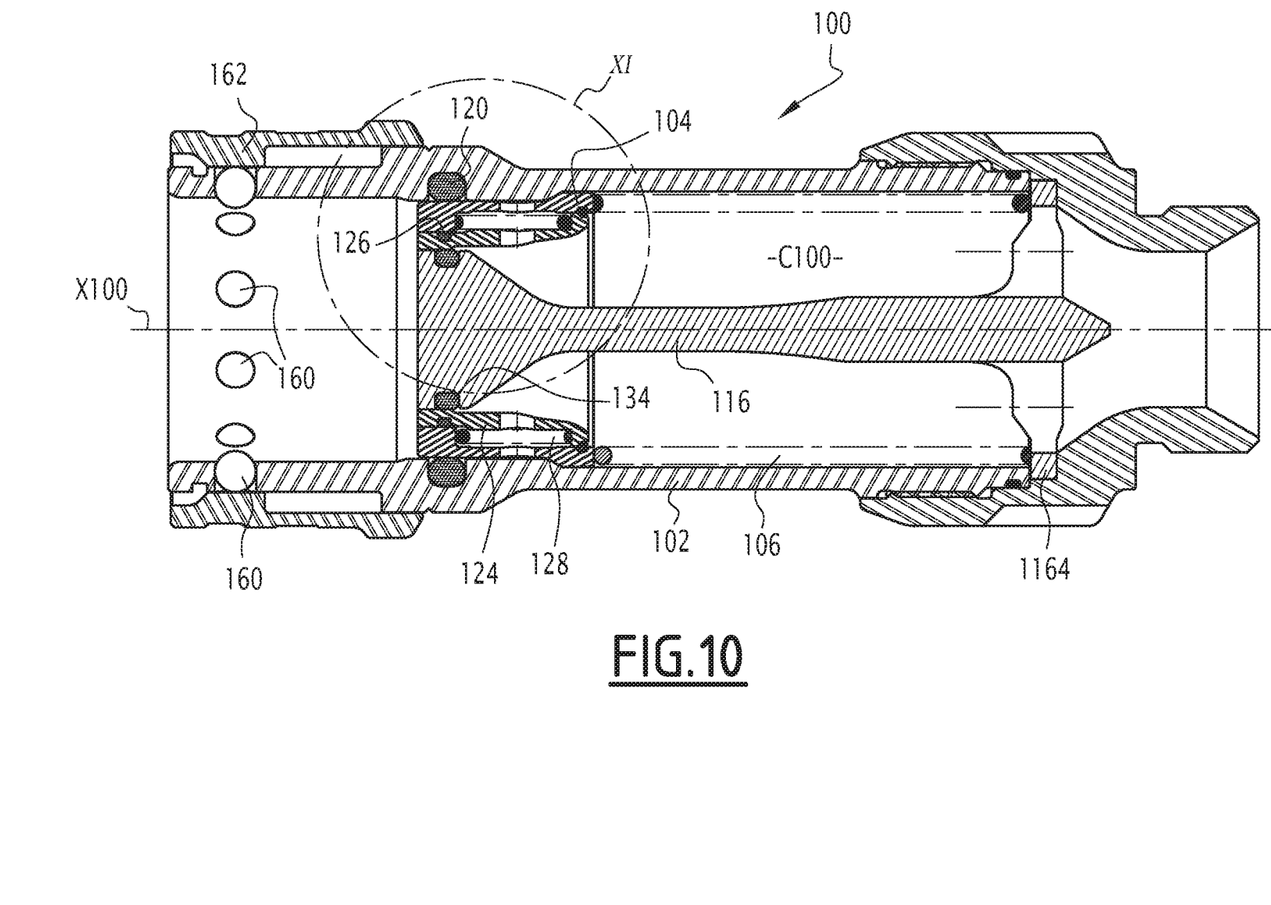
FIG. 10 is a longitudinal sectional view of a coupling element according to a third embodiment of the invention.
Figure 11:
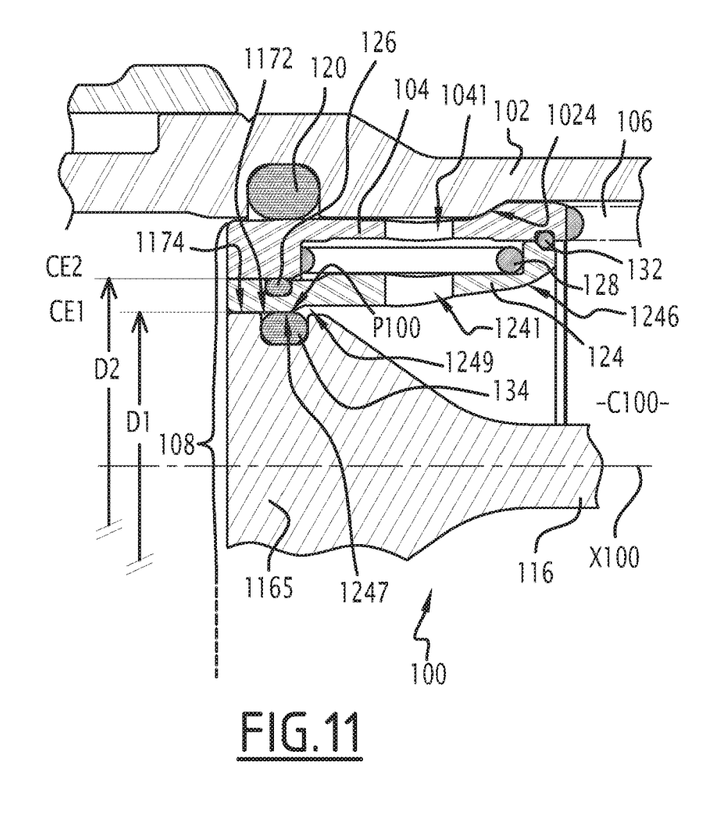
FIG. 11 is an enlarged view of detail XI of FIG. 10.

In the third embodiment of the invention, the contact zone between the relief ring 124 and the push-piece 116 is not frustoconical, like in the first two embodiments, but cylindrical with a circular base. The seal 134 is engaged in a groove 1172 arranged in an outer cylindrical surface with a circular base 1174 of the push-piece 116. On another side, an inner radial surface 1247 of the relief ring 124, which is cylindrical with a circular base, is configured to be in contact with the seal 134 in the first position of the relief ring 124, which defines a first sealing circumference CE1. The surface 1247 is bordered, on the side of the relief ring turned opposite the front face 108, by a zone 1249 accessible from the inner channel C100 in the first position of the relief ring. This zone 1249 has an increased diameter relative to that of the surface 1247. When the relief ring is pushed forward, under the effect of pressure exerted on a rear surface 1246 of this relief ring, the zone 1249 arrives across from the seal 134, along the axis X100. This results in opening a relief passage P100 through which the fluid contained in the inner channel C100 of the coupling element can flow. In FIG. 11, the location of the relief passage P100 is shown by an arrow emerging on the front face 108 of the element 100, even though, in the position of the relief ring shown in this figure, this passage is closed. It will be noted that the sealing circumference CE2 between the seal 126 borne by the relief ring 124 and the valve 104 has a diameter D2 strictly larger than the diameter D1.

Figure 12:
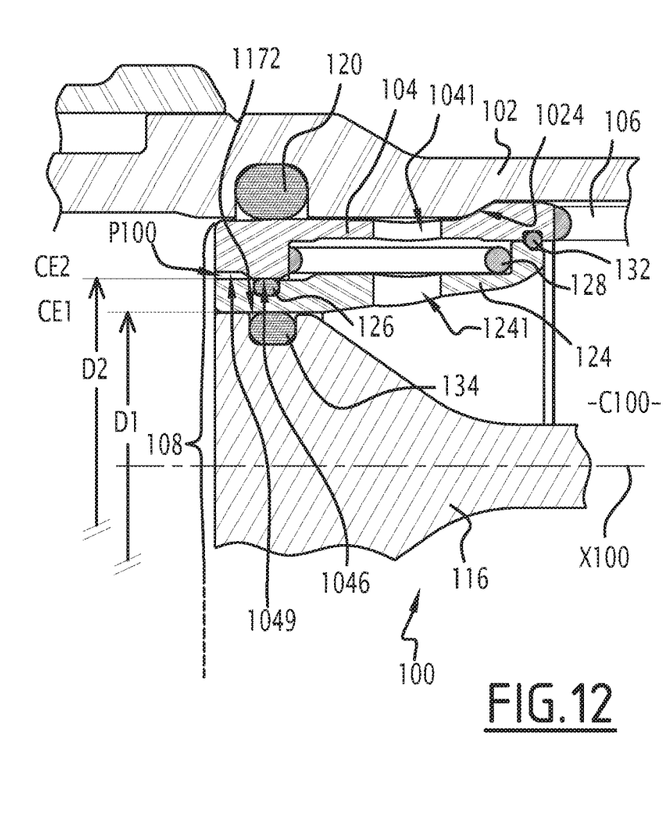
FIG. 12 is a detail view similar to FIG. 11 for a coupling element according to a fourth embodiment of the invention.

The fourth embodiment of the invention shown in FIG. 12 uses an approach close to that of the third embodiment. In this embodiment, the relief passage P100, shown under the same conditions as in FIG. 11, is defined between the relief ring 124 and the valve 104. The inner radial surface 1046 of the valve 104, which bears radially against the seal 126 in the first position of the relief ring 124 shown in FIG. 12, extends, on the side of the front face 108, by a zone 1049 with a larger diameter relative to that of the surface 1046. When the relief ring 124 is pushed back toward the left in FIG. 12, the seal 126 is axially aligned with the zone 1049 along a plane normal to the axis X100 to which the seal 126 belongs, such that it is no longer in contact with the valve 104. This results in opening the relief passage P100, through which the fluid contained in the inner channel C100 of the coupling element can flow.

In the embodiment of FIG. 12, two sealing circumferences CE1 and CE2 are defined, with the same approach as in the embodiment of FIGS. 10 and 11. The essential difference between the third and fourth embodiments is that in the third embodiment, the relief passage is arranged at the radial level of the first circumference CE1, while in the embodiment of FIG. 12, this relief passage is arranged at the second circumference CE2.

In the third and fourth embodiments mentioned above, the valve 104 and the relief ring 124 are each provided with several radial through orifices 1041, 1241, respectively, which make it possible to distribute the pressure of the fluid inside the body 102, in particular during movements of the valve 104 with respect to the seat 1024, without risking capturing fluid between the valve 104 and the body 102.

In the third and fourth embodiments, as shown only in FIG. 10, the female coupling element 100 is provided with a bead locking system 160 intended to cooperate with a peripheral groove of a complementary male coupling element. The radial position of these beads with respect to the axis X100 is controlled by a ring 162.

Additionally, in these two embodiments, a circlips 132 is used to keep the relief ring 124 on the valve 104, by forming a stop withstanding the force exerted by the spring 128.

Figure 13:
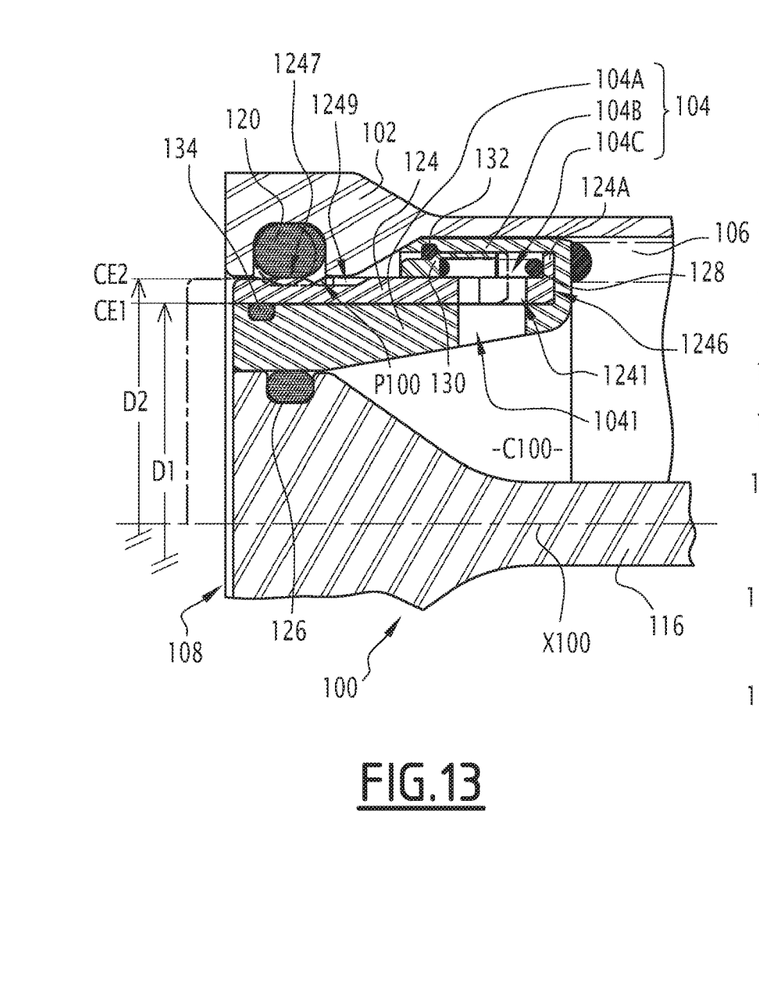
FIG. 13 is a detail view similar to FIG. 11 for a coupling element according to a fifth embodiment of the invention.

In the fifth embodiment of the invention shown in FIG. 13, the valve 104 is mounted around the push-piece 116 on the front face of the coupling member, while being subject to the action of the spring 106. The valve 104 belongs to the means for closing off the inner channel C100 of the coupling element 100. In this embodiment, the central member comprises the push-piece 116 and the valve 104. The sealing ring 124 here is radially inserted between a main part 104A of the valve 104 and the body 102 of the coupling element 100. An auxiliary part 104B of the valve 104 radially surrounds a rear lug 124A of the relief ring 124.

The relief ring 124 is subject to the action of an elastic return spring 128 that pushes it back toward the inside of the body 102, relative to the valve 104, and toward its first position. To that end, the spring 128 is received in a housing 104C, radially defined between the parts 104A and 104B of the valve 104, and bearing on a stop ring 130, which in turn is immobilized in the housing 104C relative to the valve 104 using a circlips 132.

The valve 104 and the sealing ring 124 are provided with several orifices 1041, 1241, respectively, which help the pressure prevailing in the conduit C100 of the coupling element also to be applied on the relief ring 124, in the housing 104C and up to a surface 1246 of the lug 124A turned opposite the front face 108.

In practice, the pressure prevailing in the conduit C100 applies on all of the surfaces of the relief ring 124 situated aligned with the seals 120 and 134 in FIG. 13. The pressure forces cancel one another out in pairs, except at a ring corresponding to a projection parallel to the axis X100 of the area between the seals 120 and 134 perpendicular to X100 on the surface 1246. The resultant, on the relief ring 124, of the pressure prevailing in the conduit C100 is therefore a force oriented toward the left in FIG. 13, i.e., toward the front face 108.

When the pressure in the conduit C100 increases, the force exerted on the surface 1246 results in causing the relief ring 124 to go from its first position shown in solid lines in FIG. 13 to its second position shown in axis lines.

Reference 1247 denotes the outer peripheral surface of the relief ring 124 against which the seal 120 bears radially. This surface 1247 is bordered, opposite the front face 108, by a peripheral groove 1249, which is axially offset, along the axis X100, relative to the seal 120 when the relief ring 124 is in its first position. This groove 1249 is axially aligned with this seal when the relief ring is in its second position. Thus, in this second position, a relief passage P100 is created between the relief ring 124 and the body 102 of the coupling element 100.

Like in FIGS. 11 and 12, the location of the relief passage P100 is shown by an arrow in FIG. 13, even though this passage is closed in the illustrated configuration.

In this embodiment, the first sealing circumference CE1 is defined between the valve 104 and the sealing ring 124, with a diameter D1, and the second sealing circumference CE2 is defined between the sealing ring 124 and the body 102, with a diameter D2, strictly larger than the diameter D1.

Figure 14:
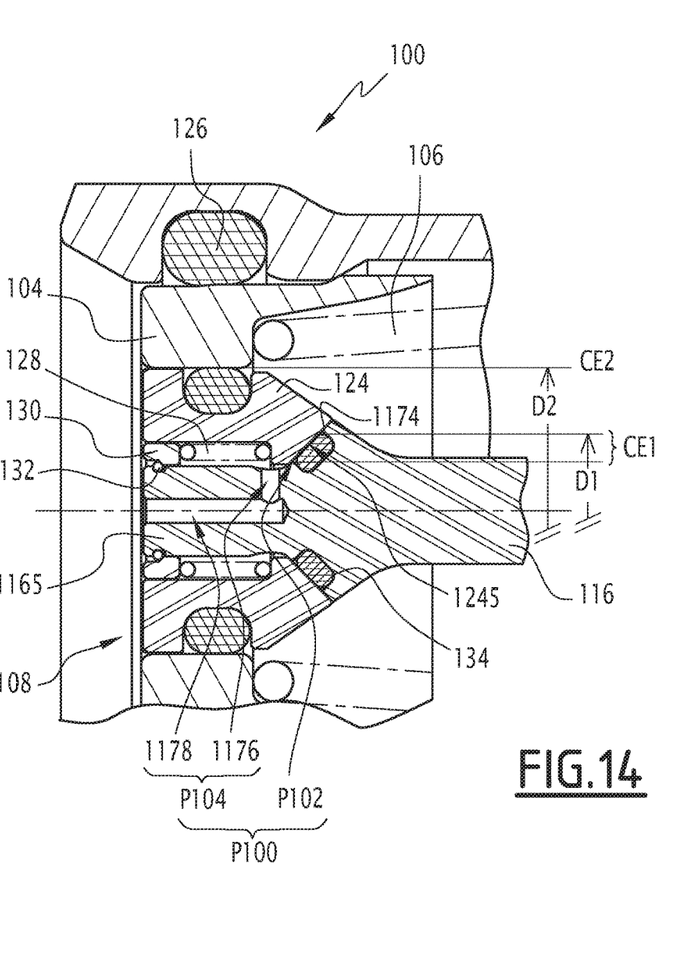
FIG. 14 is a detail view similar to FIG. 11 for a coupling element according to a sixth embodiment of the invention.

In the sixth embodiment of the invention shown in FIG. 14, the relief passage P100 comprises a first portion P102 defined between the surfaces 1245 and 1174, respectively arranged on the relief ring 124 and on the push-piece 116 like in the first embodiment, and a second portion P104 formed by channels 1176 and 1178 arranged within the nose 1165 of the push-piece 116. In the first, second and sixth embodiments of the invention, when it is in its first position, the relief ring 124 or 224 bears against a seat formed by the surface 1174 or by a corresponding surface of the valve 204, along an inclined direction relative to the axis X100 or X200, therefore in part along a direction parallel to this axis. Alternatively, the surfaces 1174 and equivalent can be perpendicular to these axes, in which case the bearing of the relief ring against its seat takes place parallel to the axis X100 or X200. In all cases, for these embodiments and in this first position, the relief ring closes off the relief passage P100 formed at least partially between the central member and the relief ring at the first circumference CE1. In the first, second and sixth embodiments, the first sealing circumference CE1 has a non-zero radial thickness. Alternatively, this radial thickness may be zero or practically zero, like for the second sealing circumference CE2.

A sealing circumference is generally defined as the curve along which two mechanical parts can maintain sealed contact, in other words, sealed bearing, with or without using an intermediate sealing means, such as a seal, whether permanently or removably. These sealing circumferences serve to limit the passage of fluid between the mechanical parts. They are preferably defined along the inner or outer contact surfaces of the annular seals. When a sealing circumference CE1 or CE2 is considered, and when the latter has a non-zero radial thickness, a diameter of this sealing circumference is a diameter whose value is comprised between the maximum diameter and the minimum diameter of this sealing circumference. In the example of the first, second and sixth embodiments, all of the diameters of the sealing circumference CE1 are strictly smaller than the diameter D2, since the maximum diameter D1 is smaller than the diameter D2.

Alternatively, the invention provides that one or the other of the circumferences CE1 and CE2 has a non-zero radial thickness.

In the first, second, third and sixth embodiments, the relief passage P100 or P200 is no longer closed off in the second position of the relief ring at the first circumference CE1, which is smaller than the second circumference CE2. In the fourth and fifth embodiments, the relief passage P100 is made at the second circumference CE2, which is larger than the first circumference CE1.

In all of the embodiments, the surfaces forming the front faces 108 and 208 are, with the exception of the frustoconical surfaces 1028 and 1028', perpendicular to the longitudinal axis X100 or X200 of the coupling element 100 or 200 to which they belong. In the uncoupled configuration of the coupling member and except in case of leaks through the relief passage, the front faces are planar, except regarding these surfaces 1028 and 1028'. Thus, the closing off element and the central member do not have a protruding shape and form a face of the coupling member perpendicular to its longitudinal axis that can easily be cleaned in the uncoupled configuration of the coupling member.

The invention is not limited to the embodiments described above, and several alternatives can be considered.

In particular, the connection mode between the coupling elements 100 and 200 in the pipes C1 and C2 can be different from that which has been illustrated. For example, the rear portions of the coupling elements 100 and 200 can comprise tubular end-pieces of the "Christmas tree tail" type on which hoses making up the pipes C1 and C2 can be attached.

The use of the expressions "around" and "inside" indicates the relative positions of a first part with respect to a second part, these parts not necessarily being in direct contact with one another, but being able to define a space between them in which a mechanical part can be radially inserted.

The valve seals, in particular the seals 120, 126 and 220, can be mounted indifferently on the closing off element or on the complementary element against which this seal is in contact in the illustrated embodiments. Furthermore, the seal 134 or 234 can be mounted on the relief ring 124 or 134, in which case it bears against the central member 116 or 204 when the relief ring is in its first position.

According to the embodiments, the seal 134 or 234 can be a seal other than an O-ring, in particular a seal with a noncircular section that is glued on the valve 204 or on the closing off means opposite the valve relative to the passage P100, instead of being inserted in a groove.

The slots 1169 that make up an axial part of the relief passage P100 can be provided in a number different from three, or have a profile different from that shown in FIG. 5.

The shape of the relief ring 124 can be different from that shown in the figures, as long as it makes it possible to keep two sealed contact circumferences CE1 and CE2 with different diameters D1 and D2.

A coupling member R can comprise a single element equipped with a relief ring 124 or 224 and according to the invention, or both its male and female elements are according to the invention.

The invention applies to coupling members and couplers for liquid or gaseous fluids.

The features of the embodiments and alternatives described above may be combined to generate new embodiments of the invention.

The invention claimed is:

1. A quick coupling element for removably joining pressurized fluid pipes, said coupling element comprising
a tubular body defining an inner channel for the passage of a pressurized fluid and a longitudinal axis of the coupling element,
means for closing off the inner channel on a side of a front face of the coupling element,
a relief member of the inner channel, movable between a first position, in which it said relief member closes off a relief passage connecting the inner channel to the outside of the body, and a second forward position relative to the first position, in which said relief member does not close off the relief passage,
wherein
the relief member is a relief ring that is part of the means for closing off the inner channel and that is mounted around a central member, which is also part of the closing off means, and inside a peripheral part,
a first surface of the relief ring is part of the front face,
the relief ring is movable, relative to the central member and parallel to the longitudinal axis, between its first and second positions,
the relief ring defines, at least in part, the relief passage with the central member or with the peripheral part, and
in its first position, the relief ring bears sealably against the central member, over a first sealing circumference, and bears sealably against the peripheral part, over a second sealing circumference,
a diameter of the second sealing circumference is strictly larger than a diameter of the first sealing circumference, and
the coupling element comprises an elastic return member for returning the relief ring toward its first position, said elastic member pushing the relief ring back toward the inside of the tubular body and/or toward the rear of the coupling element.

2. The coupling element according to claim 1, wherein:
the means for closing off the inner channel on the side of the front face comprise a valve moving, along the longitudinal axis, between a first closing position, where said valve closes off the inner channel, and a second withdrawn position relative to its first position, where said valve defines an annular passage placing the inner channel in communication with an inner channel of a complementary coupling element,
the relief ring is separate from the valve and movable, along the longitudinal axis, from its first position toward its second position, under the effect of the fluid pressure within the inner channel.

3. The coupling element according to claim 1, wherein, in its first position, the relief ring bears, along a direction parallel to the longitudinal axis, against a sealing seat formed by the central member and closes off the relief passage that it defines with the central member.

4. The coupling element according to claim 1, wherein the closing off means further comprise a valve that is positioned, radially to the longitudinal axis, between the central member and the body, the valve forming the peripheral part and surrounding the relief ring at the front face.

5. The coupling element according to claim 4, wherein, in the second position of the relief ring, the relief passage extends between the valve and the relief ring.

6. The coupling element according to claim 1, wherein the closing off means further comprise a valve that is positioned, radially to the longitudinal axis, between the central member and the body and that is positioned, at the front face, radially to the inside of the relief ring.

7. The coupling element according to claim 6, wherein, in the second position of the relief ring, the relief passage extends between the valve and the relief ring.

8. The coupling element according to claim 1, wherein the tubular body forms the peripheral part and defines, with the relief ring, the relief passage that the relief ring closes off when it is in its first position and in sealed bearing with the tubular body.

9. The relief member according to claim 1, wherein the central member is secured to the body and comprises a surface that constitutes part of the front face.

10. The coupling element according to claim 1, wherein the central member and the relief ring belong to an assembly movable, parallel to the longitudinal axis and relative to the body, between a forward position, where the moving assembly is in sealed contact with body and closes off the inner channel, and a withdrawn position, where a fluid passage is arranged between the moving assembly and the body.

11. The coupling element according to claim 1, wherein, in its first position, the relief ring bears, on the first sealing circumference, against a surface of the central member that is frustoconical and convergent toward the front face.

12. The coupling element according to claim 11, wherein the frustoconical surface has an apical angle comprised between 60 and 120°.

13. The coupling element according to claim 1, wherein, in an uncoupled configuration of the coupling element, the relief passage emerges on the front face.

14. The coupling element according to claim 1, wherein, in an uncoupled configuration of the coupling element and when the relief ring is in its first position, respective front faces of the closing off means are aligned in a plane perpendicular to the longitudinal axis.

15. A quick coupling member for removably joining pressurized fluid pipes, said coupling member comprising a female coupling element and a male coupling element complementary to the female coupling element, wherein at least one of the coupling elements is according to claim 1.

16. The quick coupling member according to claim 15, wherein, in the coupled configuration of the coupling member, at least one mechanical member for closing off the inner channel of the coupling element is in a withdrawn position, where said mechanical member defines, with the body of this coupling element, an annular passage for the flow of the pressurized fluid.

* * * * *